US011910155B2

(12) United States Patent
Dan et al.

(10) Patent No.: US 11,910,155 B2
(45) Date of Patent: Feb. 20, 2024

(54) MEMS SPEAKER

(71) Applicant: AAC Kaitai Technologies (Wuhan) CO., LTD, Hubei (CN)

(72) Inventors: Qiang Dan, Shenzhen (CN); Yiwei Zhou, Shenzhen (CN); Yu Shen, Shenzhen (CN); Yang Li, Shenzhen (CN)

(73) Assignee: AAC Kaital Technologies (Wuhan) CO., LTD, Wuhan (CN)

( * ) Notice: Subject to any disclaimer, the term of this patent is extended or adjusted under 35 U.S.C. 154(b) by 0 days.

(21) Appl. No.: 17/879,756

(22) Filed: Aug. 2, 2022

(65) Prior Publication Data

US 2023/0283947 A1 Sep. 7, 2023

(30) Foreign Application Priority Data

Mar. 3, 2022 (CN) ......................... 202220453634.2

(51) Int. Cl.

| | |
|---|---|
| ***H04R 1/28*** | (2006.01) |
| ***H04R 1/02*** | (2006.01) |
| ***H04R 19/02*** | (2006.01) |
| ***H04R 3/00*** | (2006.01) |

(52) U.S. Cl.

CPC ............. *H04R 1/288* (2013.01); *H04R 1/023* (2013.01); *H04R 1/025* (2013.01); *H04R 3/00* (2013.01); *H04R 19/02* (2013.01); *H04R 2201/003* (2013.01)

(58) Field of Classification Search

CPC ........ H04R 1/288; H04R 1/023; H04R 1/025; H04R 3/00; H04R 19/02; H04R 2201/003

See application file for complete search history.

(56) References Cited

U.S. PATENT DOCUMENTS

| | | | | |
|---|---|---|---|---|
| 9,363,595 B2 * | 6/2016 | Horibe | H04R 3/005 | |
| 2015/0086050 A1 * | 3/2015 | Feyh | B81C 1/00269 | 257/416 |
| 2015/0273524 A1 * | 10/2015 | Ely | H04R 19/005 | 310/322 |
| 2016/0037243 A1 * | 2/2016 | Lippert | H04R 1/023 | 381/166 |
| 2016/0043664 A1 * | 2/2016 | Theuss | B81B 7/007 | 310/300 |
| 2017/0041717 A1 * | 2/2017 | Zou | B81C 1/00158 | |

(Continued)

FOREIGN PATENT DOCUMENTS

| | | | |
|---|---|---|---|
| KR | 20170060008 A * | 5/2017 | H04R 19/02 |
| WO | WO-2015162248 A1 * | 10/2015 | H04R 19/02 |

*Primary Examiner* — Oyesola C Ojo

(74) *Attorney, Agent, or Firm* — W&G Law Group

(57) ABSTRACT

The present disclosure discloses a MEMS speaker including a housing with a receiving space; a MEMS speaker chip with an inner cavity, accommodated in the receiving space and connected with the housing, the MEMS speaker chip dividing the receiving space into a first cavity and a second cavity communicating with the inner cavity; a sound hole communicating with the first cavity or the second cavity; and a damping mesh connected to the housing and covering the sound hole; wherein sounds emitted by the MEMS speaker chip transmit outward through the sound hole and the damping mesh. Compared with the related art, MEMS speaker disclosed by the present disclosure has a better reliability.

9 Claims, 5 Drawing Sheets

(56) References Cited

U.S. PATENT DOCUMENTS

| | | | | |
|---|---|---|---|---|
| 2017/0230756 | A1* | 8/2017 | Schelling | H04R 19/02 |
| 2017/0280251 | A1* | 9/2017 | Clerici | H04R 3/12 |
| 2017/0369305 | A1* | 12/2017 | Suvanto | B81B 7/008 |
| 2022/0009768 | A1* | 1/2022 | Lo | H04R 1/227 |
| 2022/0386000 | A1* | 12/2022 | Wen | H04R 1/2811 |
| 2023/0217154 | A1* | 7/2023 | Grossman | H04R 1/2823<br>381/113 |

* cited by examiner

MEMS SPEAKER

FIELD OF THE PRESENT DISCLOSURE

The present disclosure relates to a field of sound-electric conversion technology, in particular to a micro-electro-mechanical system (MEMS) speaker.

DESCRIPTION OF RELATED ART

As one of the main components of mobile terminals such as mobile phones, speakers mainly convert electrical signals into sound signals.

MEMS speakers (Micro-Electro-Mechanical System) what is micro-electromechanical system speakers, have the advantages of better consistency, lower power consumption, smaller size, and lower price compared to traditional voice coil speakers. A MEMS speaker in related art includes a printed circuit board, a casing connected with the printed circuit board for forming an accommodation space, and a MEMS speaker chip located in the accommodation space, the casing includes a sound hole. However, the total harmonic distortion of the MEMS speaker chip increases when it vibrates to make sound, which greatly affects the performance of the MEMS speaker.

Thus, it is necessary to provide a MEMS speaker to solve the problem.

SUMMARY OF THE DISCLOSURE

A MEMS speaker includes a housing with a receiving space; a MEMS speaker chip with an inner cavity, accommodated in the receiving space and connected with the housing, the MEMS speaker chip dividing the receiving space into a first cavity and a second cavity communicating with the inner cavity; a sound hole communicating with the first cavity or the second cavity; and a damping mesh connected to the housing and covering the sound hole; wherein sounds emitted by the MEMS speaker chip transmit outward through the sound hole and the damping mesh.

Further, an acoustic impedance value of the damping mesh is in a range of 1 Mrayl-500 Mrayl.

Further, the housing includes a printed circuit board connected with the MEMS speaker chip and a shell assembled with the printed circuit board for forming the receiving space, the shell and the MEMS speaker chip form the first cavity, the printed circuit board and the MEMS speaker chip form the second cavity, the sound hole is formed on the shell, and the damping mesh is attached to the shell.

Further, the shell includes a top wall spaced from the printed circuit board and a side wall located between the printed circuit board and the top wall, the side wall is connected with the printed circuit board and the top wall respectively, the sound hole is formed on the top wall, and the damping mesh is connected with the top wall.

Further, the top wall is provided with a first outer surface away from the receiving space, and the damping mesh is attached to the first outer surface of the top wall.

Further, the shell includes a top wall spaced from the printed circuit board and a side wall located between the printed circuit board and the top wall, the side wall is connected with the printed circuit board and the top wall respectively, and the sound hole is formed on the side wall.

Further, one end of the damping mesh is connected with the top wall of the shell, and the other end is connected to the printed circuit board.

Further, the damping mesh includes an inner surface facing the receiving space, one end of the inner surface of the damping mesh is connected with the top wall of the shell, and the other end of the inner surface is connected with the printed circuit board.

Further, the printed circuit board includes a through hole communicating with the second cavity, and the MEMS speaker further includes a dust mesh covering the through hole.

Further, the housing includes a printed circuit board connected with the MEMS speaker chip and a shell assembled with the printed circuit board for forming the receiving space, the shell and the MEMS speaker chip form the first cavity, the printed circuit board and the MEMS speaker chip form the second cavity, the sound hole is formed on the printed circuit board and communicates with the second cavity, and the damping mesh is attached to the printed circuit board.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, and technical solutions and beneficial effects of the present disclosure more apparent, the present disclosure is described in further detail together with the figure and the embodiment. It should be understood the specific embodiment described hereby is only to explain the disclosure, not intended to limit the disclosure.

First Embodiment

Figure 1:
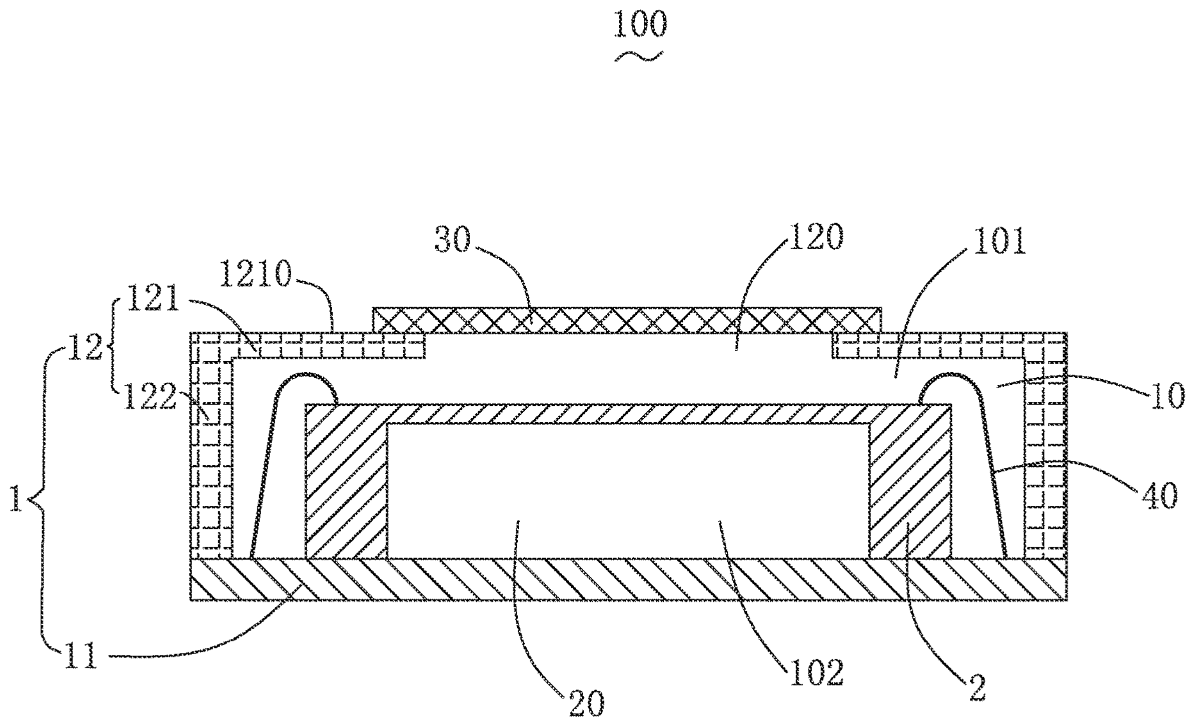
FIG. 1 is a cross-sectional view of the MEMS speaker provided in a first embodiment.

Referring to FIG. 1, this embodiment provides a MEMS speaker 100, including a housing 1 with a receiving space 10 and a MEMS speaker chip 2 connected with the housing 1. The MEMS speaker chip 2 with an inner cavity 20 divides the receiving space 10 into a first cavity 101 and a second cavity 102, the second cavity 102 communicates with the inner cavity 20. In this embodiment, the housing 1 includes a printed circuit board 11 connected with the MEMS speaker chip 2 and a shell 12 assembled with printed circuit board 11 for forming the receiving space 10. The shell 12 and the MEMS speaker chip 2 form the first cavity 101, the printed circuit board 11 and the MEMS speaker chip 2 form the second cavity 102. The second cavity 102 is the inner cavity 20 of the MEMS speaker chip 2. In addition, the MEMS speaker chip 2 is electrically connected to the printed circuit board 11 via a bonding gold wire 40. The shell 12 is provided with a sound hole 120 communicating with the first cavity 101. The MEMS speaker chip 2 emits sounds transmitting outward through the first cavity 101 and the sound hole 120. The first cavity 101 serves as a front cavity and the second cavity 102 serves as a rear cavity.

The MEMS speaker 100 further includes a damping mesh 30 attached to the shell 12 and covering the sound hole 120. The MEMS speaker chip 2 emits sounds transmitting outward through the sound hole 120 and the damping mesh 30. Therefore, the quality factor Q value of the MEMS speaker 100 can be effectively adjusted through the damping mesh 30, the resonance caused by the front cavity can be reduced, and the total harmonic distortion can be improved, thereby improving the performance of the MEMS speaker 100. Preferably, an acoustic impedance value of the damping mesh 30 is in a range of 1 Mrayl-500 Mrayl. The damping mesh 30 completely covers the sound hole 120.

Figure 2:
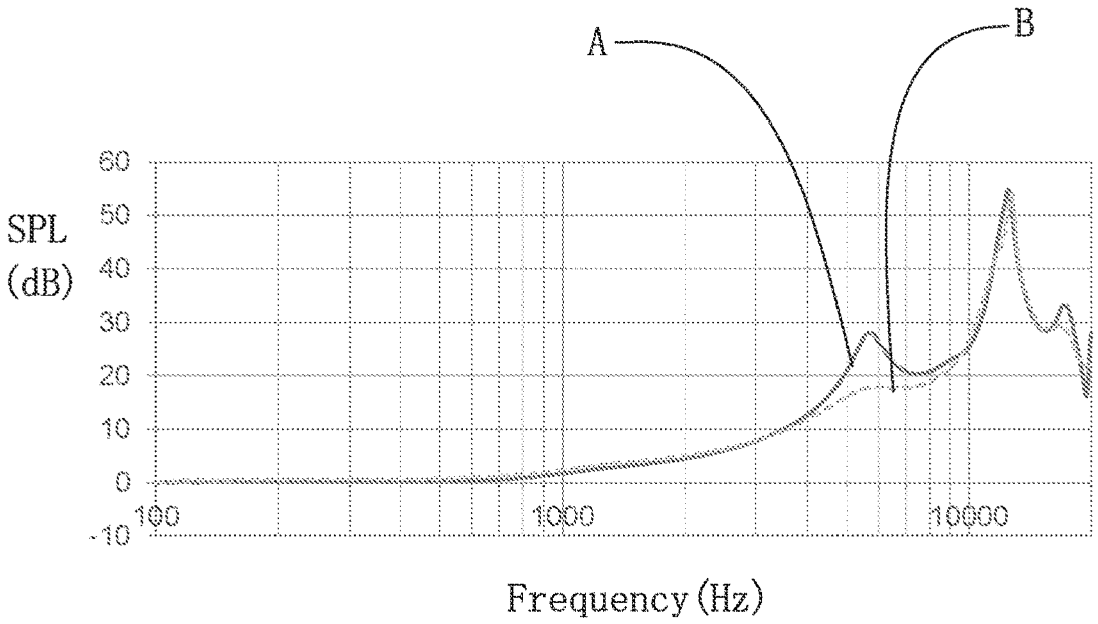
FIG. 2 is a sound pressure level SPL of the comparative test data according to the MEMS speaker in the first embodiment and the MEMS speaker in related art.

FIG. 2 is a sound pressure level SPL of the comparative test data according to the MEMS speaker in this embodiment and the MEMS speaker in related art. The related MEMS speaker is not provided with a damping mesh, and its SPL curve is the A curve, the SPL curve of the present application is the B curve. The following conclusion can be drawn: the provision of the damping mesh 30 can suppress the SPL resonance peak caused by the front cavity.

Figure 3:
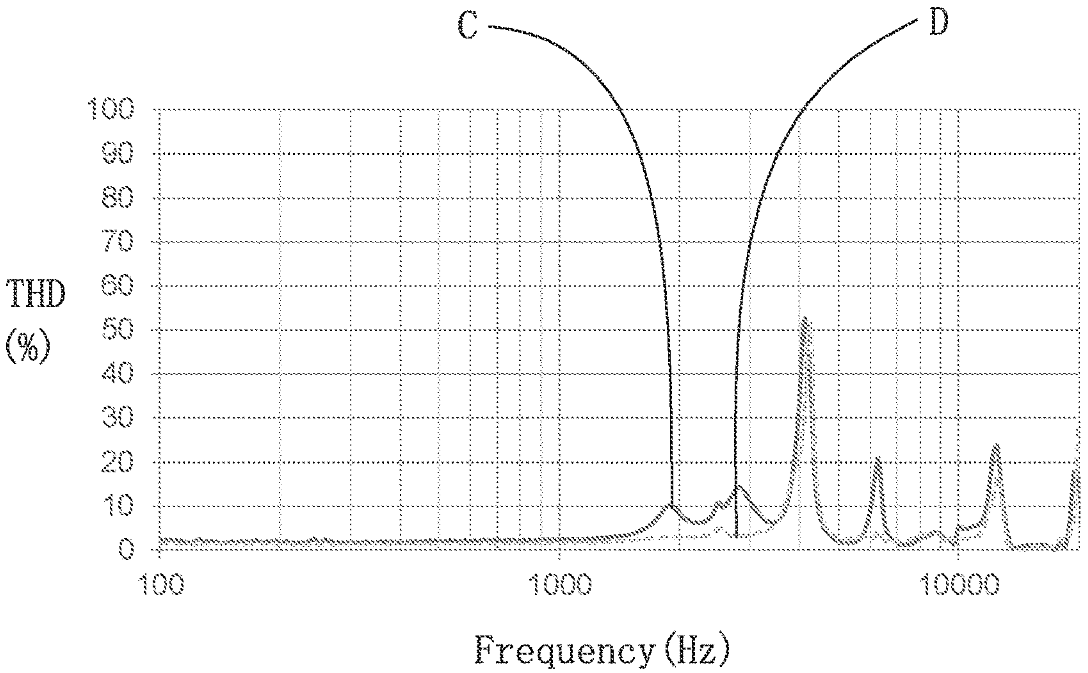
FIG. 3 is a total resonance distortion THD of the comparative test data according to the MEMS speaker in the first embodiment and the MEMS speaker in related art.

FIG. 3 is s a total resonance distortion THD of the comparative test data according to the MEMS speaker in this embodiment and the MEMS speaker in related art. The related MEMS speaker is not provided with a damping mesh, and its THD curve is the C curve, the THD curve of the present application is the D curve. The following conclusion can be drawn: the provision of the damping mesh 30 can suppress the THD resonance peak caused by the front cavity.

In addition, in this embodiment, the shell 12 includes a top wall 121 spaced from the printed circuit board 11 and a side wall 122 located between the printed circuit board 11 and the top wall 121, two ends of the side wall 122 are respectively connected with the printed circuit board 11 and the top wall 121, the sound hole 120 is provided through the top wall 121. In this way, the sounds emitted by the MEMS speaker 100 could transmit from the front side. The top wall 121 includes a first outer surface 1210 away from the receiving space 10, the damping mesh 30 is attached to the first outer surface 1210 of the top wall 121, therefore, the damping mesh 30 is not only easy to install, but also does not occupy the internal space of the MEMS speaker 100.

Second Embodiment

Figure 4:
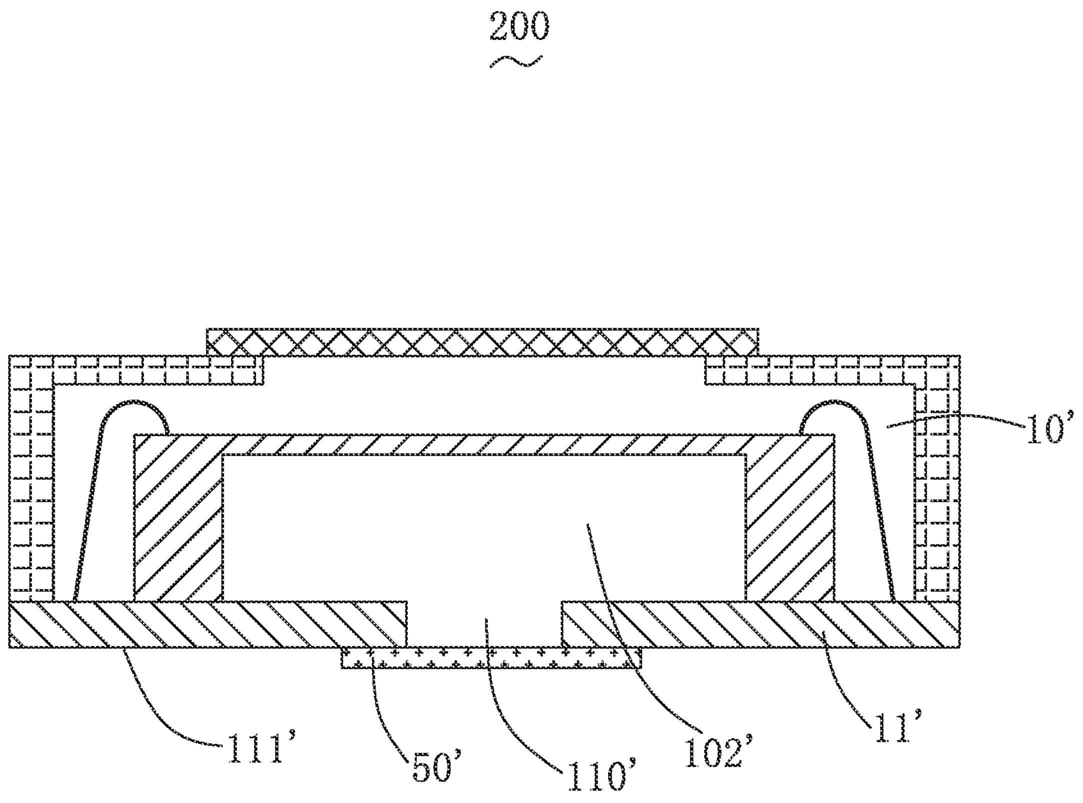
FIG. 4 is a cross-sectional view of the MEMS speaker provided in a second embodiment.

Referring to FIG. 4, a MEMS speaker 200 is provided by the second embodiment. The distinction between the second embodiment and the first embodiment is that, the printed circuit board 11' further includes a through hole 110' communicating with the second cavity 102', and the MEMS speaker 200 also includes a dust mesh 50' covering the through hole 110'. The through hole 110' can increase the volume of the back cavity and improve the low frequency effect of the MEMS speaker 200. Specifically, the printed circuit board 11' is provided with a second outer surface 111' away from the receiving space 10', and the dust mesh 50' is attached to the second outer surface 111' of the printed circuit board 11'. the dust mesh 50' can not only be used as a dustproof and waterproof mesh, but also as a damping mesh.

Third Embodiment

Figure 5:
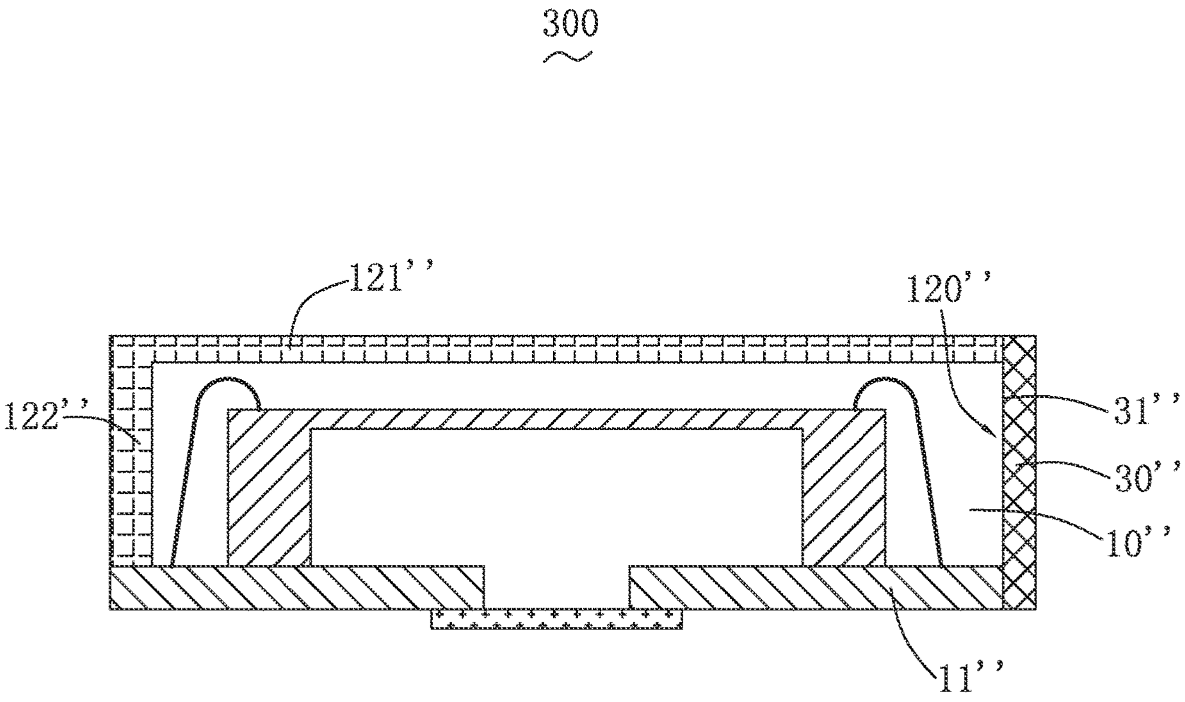
FIG. 5 is a cross-sectional view of the MEMS speaker provided in a third embodiment.

Referring to FIG. 5, a MEMS speaker 300 is provided by the third embodiment. The distinction between the third embodiment and the second embodiment is that, the sound hole 120" is formed on the side wall 122" of the housing, one end of the damping mesh 30" is connected with the top wall 121", and the other end is connected with the printed circuit board 11". In this way, the sounds emitted by the MEMS speaker 300 could transmit from the side. Specifically, the damping mesh 30" includes an inner surface 31" facing the receiving space 10", the inner surface 31" of the damping mesh 30" is connected with the top wall 122" and the printed circuit board 11", and the damping mesh 30" is flush with the top wall 122" and the printed circuit board 11".

Fourth Embodiment

Figure 6:
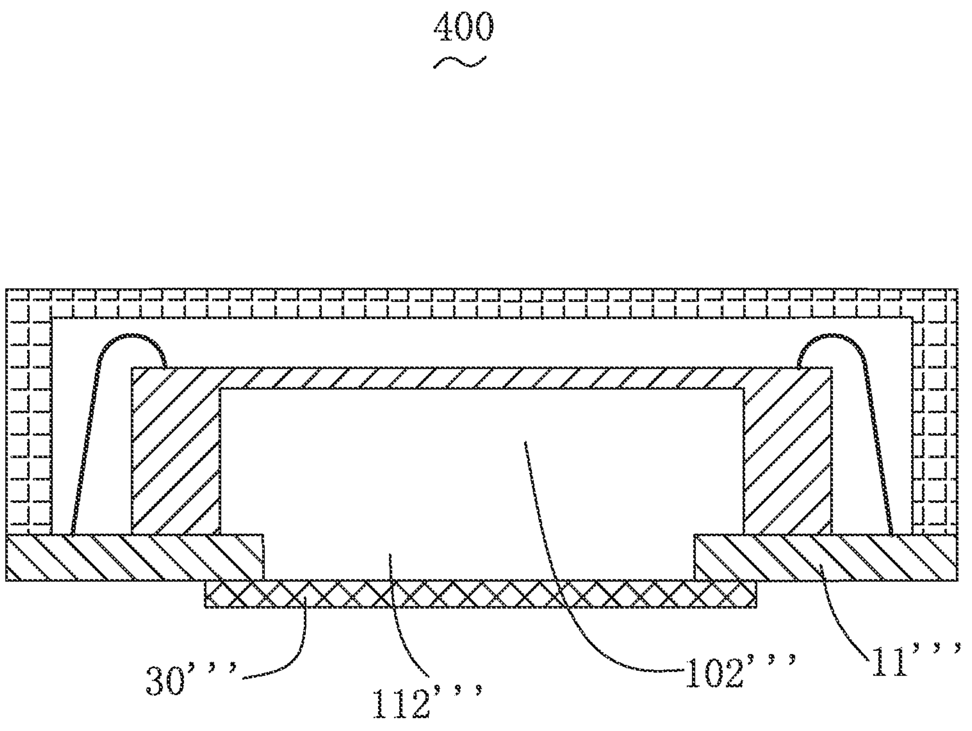
FIG. 6 is a cross-sectional view of the MEMS speaker provided in a fourth embodiment.

Referring to FIG. 6, a MEMS speaker 400 is provided by the fourth embodiment. The distinction between the fourth embodiment and the first embodiment is that, the sound hole 112'" is arranged on the printed circuit board 11', the damping mesh 30'" is attached to the printed circuit board 11'", the damping mesh 30'" could be attached to the inner surface of the printed circuit board 11'" or the outer surface of the printed circuit board 11'". The second cavity is used as the front cavity in this embodiment, and the sounds emitted by the MEMS speaker 400 could transmit from the bottom of the MEMS speaker 400.

It is to be understood, however, that even though numerous characteristics and advantages of the present exemplary embodiment have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A MEMS speaker, comprising:
- a housing with a receiving space; and
- a MEMS speaker chip with an inner cavity, accommodated in the receiving space and connected with the housing, the MEMS speaker chip dividing the receiving space into a first cavity and a second cavity communicating with the inner cavity; wherein
- the housing includes a printed circuit board connected with the MEMS speaker chip and a shell assembled with the printed circuit board for forming the receiving space, the shell and the MEMS speaker chip form the first cavity, the printed circuit board and the MEMS speaker chip form the second cavity, a sound hole is formed on the shell and communicating with the first cavity, a damping mesh is attached to the shell and covering the sound hole, sounds emitted by the MEMS speaker chip transmit outward through the sound hole and the damping mesh.

2. The MEMS speaker as described in claim 1, wherein an acoustic impedance value of the damping mesh is in a range of 1 Mrayl-500 Mrayl.

3. The MEMS speaker as described in claim 1, wherein the shell includes a top wall spaced from the printed circuit board and a side wall located between the printed circuit board and the top wall, the side wall is connected with the printed circuit board and the top wall respectively, the sound hole is formed on the top wall, and the damping mesh is connected with the top wall.

4. The MEMS speaker as described in claim 3, wherein the top wall is provided with a first outer surface away from the receiving space, and the damping mesh is attached to the first outer surface of the top wall.

5. The MEMS speaker as described in claim 1, wherein the shell includes a top wall spaced from the printed circuit board and a side wall located between the printed circuit board and the top wall, the side wall is connected with the printed circuit board and the top wall respectively, and the sound hole is formed on the side wall.

6. The MEMS speaker as described in claim 5, wherein one end of the damping mesh is connected with the top wall of the shell, and the other end is connected to the printed circuit board.

7. The MEMS speaker as described in claim 6, wherein the damping mesh includes an inner surface facing the receiving space, one end of the inner surface of the damping mesh is connected with the top wall of the shell, and the other end of the inner surface is connected with the printed circuit board.

8. The MEMS speaker as described in claim 1, wherein the printed circuit board includes a through hole communicating with the second cavity, and the MEMS speaker further includes a dust mesh covering the through hole.

9. A MEMS speaker, comprising:

a housing with a receiving space; and a MEMS speaker chip with an inner cavity, accommodated in the receiving space and connected with the housing, the MEMS speaker chip dividing the receiving space into a first cavity and a second cavity communicating with the inner cavity; wherein the housing includes a printed circuit board connected with the MEMS speaker chip and a shell assembled with the printed circuit board for forming the receiving space, the shell and the MEMS speaker chip form the first cavity, the printed circuit board and the MEMS speaker chip form the second cavity, a sound hole is formed on the printed circuit board and communicating with the second cavity, a damping mesh is attached to the printed circuit board and covering the sound hole, sounds emitted by the MEMS speaker chip transmit outward through the sound hole and the damping mesh.

* * * * *